United States Patent [19]

Omori

[11] 4,186,843
[45] Feb. 5, 1980

[54] CLOSURE CAP DEVICE FOR A FUEL TANK OF A MOTORCYCLE

[75] Inventor: Yoshitaka Omori, Fujimi, Japan

[73] Assignee: Honda Giken Kogyo Kabushiki Kaisha, Tokyo, Japan

[21] Appl. No.: 944,394

[22] Filed: Sep. 21, 1978

[30] Foreign Application Priority Data

Sep. 28, 1977 [JP] Japan ............................ 52-130244[U]

[51] Int. Cl.² ...................... B65D 55/14; B65D 45/23
[52] U.S. Cl. .................................... 220/210; 220/314; 220/324; 70/164
[58] Field of Search ............... 220/314, 318, 210, 324; 292/259, DIG. 2; 70/164, 166, 167, 168, 169

[56] References Cited

U.S. PATENT DOCUMENTS

| | | | |
|---|---|---|---|
| 1,689,979 | 10/1928 | Tate et al. | ......................... 220/210 X |
| 1,747,200 | 2/1930 | White | ...................................... 70/164 |
| 1,778,989 | 10/1930 | Thomas | ................................. 70/164 |
| 2,169,312 | 8/1939 | Wilking | ................................ 220/210 |

*Primary Examiner*—Steven M. Pollard
*Attorney, Agent, or Firm*—Polster, Polster and Lucchesi

[57] ABSTRACT

A closure cap device for a fuel tank of a motorcycle which is so constructed that a lever is pivotally attached to a part of the fuel tank body in such a manner that it may be freely contacted to and separated from a closure cap fitted on the fuel pouring port of the fuel tank, a lever engagement section is formed in the outer surface of the closure cap, and engagement members are provided at the tip end part of the lever and the body of the fuel tank so as to be mutually engaged when the lever is snugly fitted into the lever engagement section in the closure cap at the time of perfect tight-fitting of the cap to the fuel pouring port.

2 Claims, 3 Drawing Figures

CLOSURE CAP DEVICE FOR A FUEL TANK OF A MOTORCYCLE

BACKGROUND OF THE INVENTION

This invention relates to a closure cap for a fuel tank of an automotive vehicle, and, more particularly, it is concerned with such closure cap which can be effectively applied to the fuel tank of a motorcycle, for instance.

In general, the closure cap device for a fuel tank in a motorcycle is of the so-called bayonet type, by which the closure cap is tight-fitted to the fuel pouring port of the fuel tank by rotating the same through a certain predetermined angle. In this type of closure cap, however, unless the cap is rotated far enough, it tends to be readily loosened by its reverse rotation due to vibrations, etc. caused by the vehicle during its running, and, in the worst case, the cap is dislodged and permits leakage of fuel from the pouring port of the fuel tank. In spite of such disadvantage with such known type of cap closing system, it is usually difficult to recognize from outside whether the cap is in its perfectly tight-fitted condition to the pouring port, or not, and, moreover, it is difficult to notice that the cap is in its insufficient closure state (i.e., a state, in which the cap is insufficiently rotated).

SUMMARY OF THE INVENTION

In view of the abovementioned disadvantage inherent in the bayonet type closure cap device for the fuel tank of a motorcycle, it is the primary object of the present invention to provide a closure cap device for the fuel tank capable of preventing insufficient rotation (or insufficient tight-fitting) of the closure cap without failure, and of maintaining the tight-fitted condition of the closure cap after it is perfectly closed.

According to the present invention, briefly stated, there is provided a closure cap device for a fuel tank of a motorcycle which comprises in combination: (a) a body of a fuel tank, (b) a fuel pouring port formed in one part of said fuel tank, (c) a closure cap fittingly provided on said fuel pouring port, said cap having at least one diametrically extending recess formed in the top external surface part thereof, (d) a lever pivotally provided at one part on the top surface part of said fuel tank body in the vicinity of said closure cap in a manner to be snugly received and fitted into said diametrically extending recess formed in said closure cap, and (e) a pair of opposed engagement members, one being provided at the tip end part of said lever opposite to the pivotally supported end thereof, and the other being provided on the top surface of said fuel tank body, said engagement members being engaged when said lever has been fitted into said lever receiving section in said closure cap at the time of perfect tight-fitting of said closure cap onto said fuel pouring port of the fuel tank body.

Important features of the present invention have been outlined rather broadly in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception, upon which this disclosure is based may readily be utilized as a basis for the designing of other structures for carrying out the several purposes of the present invention. It is important, therefore, that the claims be regarded as including such equivalent constructions so far as they do not depart from the spirit and scope of the present invention.

BRIEF DESCRIPTION OF THE ACCOMPANYING DRAWINGS

Specific embodiments of the present invention have been chosen for the purpose of illustration and description, and are shown in the accompanying drawings, forming a part of the specification, in which.

DETAILED DESCRIPTION OF PREFERRED EMBODIMENT

In the following, the closure cap device of the present invention will be described in detail in reference to the accompanying drawing.

Figure 1:
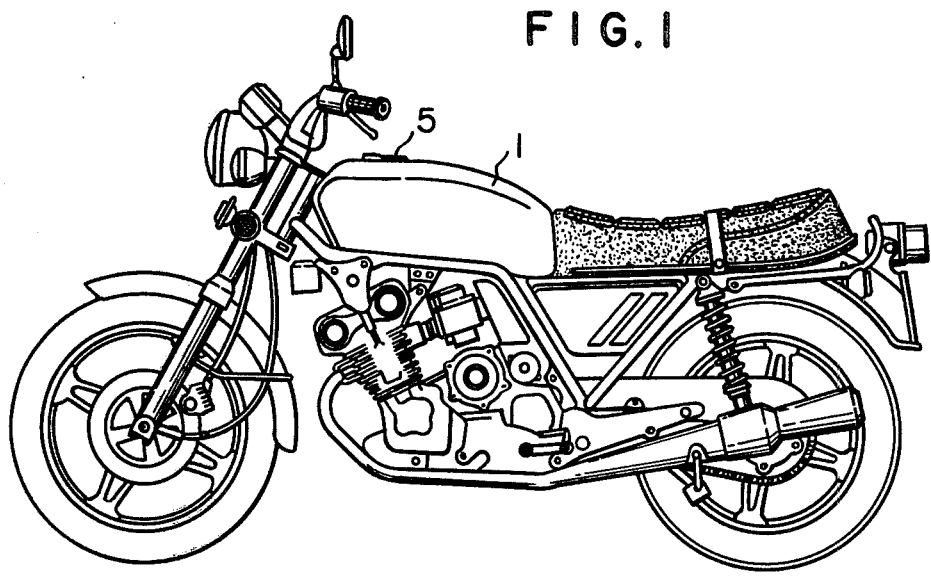
FIG. 1 is a general side view showing a motorcycle having the closure cap device of the present invention incorporated therein.
Figure 2:
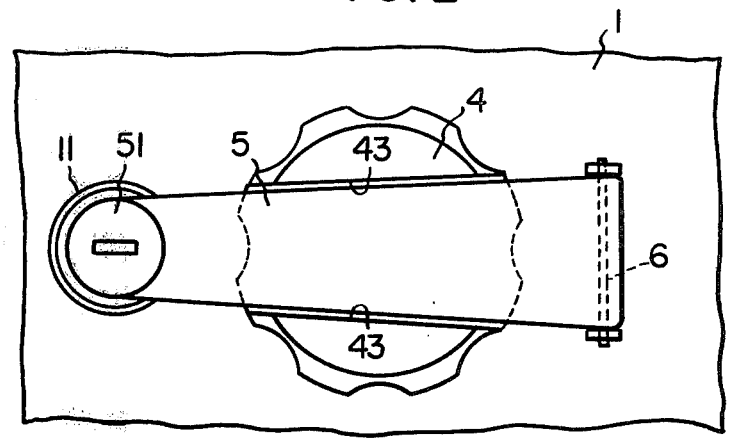
FIG. 2 is a plan view of the closure cap device according to the present invention.
Figure 3:
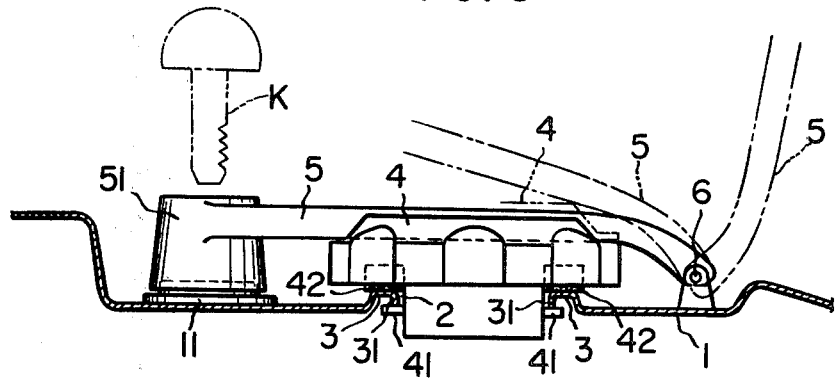
FIG. 3 is a side elevational view, partly cut away, of the closure cap device according to the present invention.

Referring to FIGS. 1, 2 and 3, a reference numeral 1 designates a body of the fuel tank, a reference numeral 2 designates a fuel pouring port, a numeral 3 refers to a mouth-piece formed on the top open brim of the fuel pouring port, a numeral 4 denotes a closure cap fitted onto the fuel pouring port, a numeral 41 designates a pawl integral with the closure cap and extending outwardly therefrom, a numeral 31 refers to a cam edge formed by downwardly bending the edge of the mouth-piece 3, with which the pawls 41 of the closure cap are engaged.

When the closure cap 4 is rotated in the tight-fitting direction, there is acted on the closure cap 4 a downward force by the engagement of the pawls 41 with the cam edge 31, and packing member 42 embedded in the lower surface of the cap facing the upper surface of the mouth-piece 3 is intensely compressed by the downward force, whereby the cap is brought to its tight-fitted, condition. When the closure cap is reversely rotated, its tight-fitted condition is released, and it becomes removable from the fuel pouring port 2.

A reference numeral 5 designates a lever (or lock plate) which can be pivotally brought up and down on a shaft 6 provided at one side of the body of the fuel tank with respect to the top surface of the closure cap 4 when it is tightly fitted onto the fuel pouring port of the fuel tank. A reference numeral 43 denotes a lever receiving groove formed on the top outer surface of the closure cap 4 in the direction to accommodate therein the lever 5 when it is pivotally brought down to the closure cap 4 in its perfectly tight-fitted state on the pouring port 2. Numerals 51 and 11 refer to opposed engagement members which engage each other when the lever 5 is received into the lever receiving groove 43 formed in the outer surface of the closure cap 4, one of the engagement members being provided at the tip end part of the lever 5 and the other being provided on the fuel tank body 1 at a position facing its counterpart. In the illustrated embodiment, these opposed engagement members are shown in the form of a lock 51 and a socket 11 which can be mutually coupled by utilizing an engine starting key K.

In more detail, when the tight-fitting of the closure cap 4 to the fuel pouring port 2 is normal (or perfect), the lever 5 is pivotally brought down to be received into the lever receiving groove 43 in the closure cap 4 to the fullest extent, whereby the engagement member 51 can be engaged with the counter-part member 11 (see the solid line position in FIG. 3).

When the tight-fitting of the closure cap is not perfect, the closure cap 4 is in a floated state from the pouring port 2 and the lever receiving groove 43 does not align with the lever 5. Therefore, even if the lever 5 is brought down to the closure cap 4, the lower surface of the lever inevitably collides with the edge of the cap 4 to be unable to completely fall down into the lever receiving groove 43 (as shown in a double-dot-and-dash line in FIG. 3 with the consequence that the rightly opposed engagement members 51 and 11 cannot be coupled together.

Therefore, depending on whether the abovementioned lever 5 can be received into the lever receiving groove 43, or not, or whether it has been rightly positioned in the lever receiving groove 43, or not, it becomes readily recognizable whether the cap 4 is perfectly tight-fitted onto the fuel pouring port 2, or not. By thus adopting the stopper lever for the closure cap, any danger of running the motorcycle without noticing such imperfect tight-fitting of the closure cap to the pouring port of the fuel tank can be removed.

Moreover, in the state of the lever 5 being locked, loosening of the cap 4 due to vibrations, etc. of the vehicle body is prevented by the engagement between the lever and the lever receiving groove 43 in the cap 4, whereby the perfect tight-fitting condition is always secured.

It is to be noted that, in place of the lever receiving groove 43, one or more numbers of the raised stripes are formed on the external surface of the closure cap 4, and corresponding numbers of grooves to receive therein the raised strips are formed in the lower surface of the lever 5.

Also, the lever 5 may be constructed in such a manner that it is freely contacted to and separated from the side surface of the closure cap 4, and the opposed engagement member may be formed on the side surface of the cap and the tip end of the lever to be exactly engaged only at the perfect tight-fitting of the closure cap.

In the case of the illustrated embodiment, the rear part of the lever 5, pivotally fitted on the shaft, is gently curved so that the lever may be in parallel with the top surface of the fuel tank body 1, and, at the same time, the top part of the engagement member 51 provided at the tip end part of the lever 5 is made flush with the top surface of the fuel tank body so that it may not project upward therefrom. Moreover, as illustrated, the lever (or lock plate) 5 is tapered toward its tip end, and the lever receiving groove 43 in the closure cap 4 is also formed correspondingly in the tapered shape, whereby the positioning for the lock becomes possible, hence a working such as breather setting, etc. becomes feasible.

What is claimed is:

1. In a closure cap device for a fuel tank of a motorcycle comprising a fuel tank with a fuel filling port, defined by a wall, formed in one part thereof, a closure cap for said fuel filling port, lever means for said closure cap to prevent the same from demounting from the fuel filling port when said lever means is in one position, and a lock engagement means for said lever means to unmovably fasten the same across said closure cap, the improvement wherein said closure cap and filling port-defining wall provide a bayonet structure and said cap has at least one engagement portion formed diametrically across the top surface part thereof to be engaged with the lever means, said engagement portion being in a tapered form; the lever means is also in a tapered form toward the tip end thereof, conforming with the shape of said tapered engagement portion; pivot means mounted on the top surface part of said fuel tank body near said closure cap, to which the opposite end of said lever means is pivotally mounted to be snugly received and fitted with said diametrically extending tapered engagement portion of said closure cap; said lock engagement means comprises a lock provided at the tip end part of said tapered lever means opposite said pivotally supported end thereof, and a socket is provided on the top surface of said fuel tank body, said engagement means being mutually engaged when said lever means is fitted with said engagement portion in said closure cap at the time of perfect tight-fitting of said closure cap onto said fuel filling port of the fuel tank body; and the top surfaces of said lever means and said lock engagement means, when they are tightly engaged with said closure cap and fastened, are generally flush with the top surface of said fuel tank body to maintain flatness on the top surface of the fuel tank.

2. The improvement as set forth in claim 1, wherein said diametrically extending engagement portion in the top surface of said closure cap is a single groove, into which said lever means is snugly fitted.

* * * * *